United States Patent [19]

Christensen et al.

[11] Patent Number: 5,709,964

[45] Date of Patent: Jan. 20, 1998

[54] MODULAR BATTERY PACK

[75] Inventors: Christian J. Christensen, Harahan; Prabhat Jain, New Orleans, both of La.

[73] Assignee: The Laitram Corporation, Harahan, La.

[21] Appl. No.: 618,363

[22] Filed: Mar. 19, 1996

[51] Int. Cl.⁶ ............................................. H01N 2/30
[52] U.S. Cl. ........................... 429/153; 429/99; 429/157; 429/178
[58] Field of Search ..................... 429/96, 99, 100, 429/123, 153, 159, 163, 178, 154

[56] References Cited

U.S. PATENT DOCUMENTS 4,265,984 5/1981 Kaye ............................................ 429/178
5,104,752 4/1992 Buaghman et al. ............................ 429/1

OTHER PUBLICATIONS

DigiCourse Brochure: Model 5010 DigiBird, 1994, (month not available).

*Primary Examiner*—M. Nuzzolillo
*Attorney, Agent, or Firm*—James T. Cronvich

[57] ABSTRACT

A battery module including multiple battery packs having electrode terminals and bypass terminals. The battery packs are compactly arranged end to end within the module with a first end of a forward battery pack proximate a second end of a rearward battery pack. Positive and negative electrode terminals at the first end of a battery pack are electrically connected to the positive and negative electrodes of a battery contained within an outer casing. Auxiliary terminals at the first end are each connected to a corresponding auxiliary terminal at the second end by an individual conductive element, such as a thin ribbon conductor running along the casing just inside its outer layer. The positive and negative terminals at the first end of a forward battery pack mate with auxiliary terminals at the second end of an adjacent rearward battery pack to retain the packs together and route the electrode connections of the forward battery pack to terminals at the first end of the rearward battery pack where they can be accessed along with the electrodes of the rearward pack.

22 Claims, 7 Drawing Sheets

MODULAR BATTERY PACK

BACKGROUND

The invention relates generally to battery packs of one or more cells and, more particularly, to battery packs having electrode terminals connected to the cell electrodes and auxiliary terminals connected to integral conductive elements bypassing the cell electrodes for mechanically connecting with other such battery packs end to end in a multi-pack battery module.

A serious shortcoming of many battery powered devices is the downtime associated with the replacement of spent batteries. To reduce the frequency of battery replacement, some devices include multiple banks of batteries and use bank-switching to switch from a discharged bank to a fresh bank. In this way, battery replacement can be deferred until all of the banks are drained.

In the offshore seismic exploration industry, for example, long hydrophone streamer cables towed by a survey vessel are outfitted with an assortment of positioning devices used to determine the relative shape of the cable and to control its depth. The positioning devices are typically attached to the streamer's outer jacket and powered by non-rechargeable batteries. Because of the expense of conducting a seismic survey, any decrease in the duration or frequency of downtime is extremely valuable to a seismic surveyor.

Some positioning devices include two banks of batteries. When the first bank discharges below a certain level, the second bank is switched in. In this way, two banks cut the frequency of battery replacement more or less in half. Besides depending on the number of battery banks, the frequency of battery replacement also depends on the capacity of each battery bank. For a given battery technology, the capacity of a battery is roughly proportional to its size or volume. Merely retrofitting an existing streamer positioning device with a larger capacity battery is not always possible because the existing battery chamber and associated interconnect wires do not accommodate cells larger than the D-size cells typically used.

In any multiple-pack arrangement of batteries within a device, the battery terminals must be electrically connected into a circuit that configures the batteries in series or parallel or in a bank-switching or other arrangement. The individual wires used in conventional streamer positioning devices, for example, take up space that could otherwise be used to accommodate additional battery capacity.

Another common problem with many battery-powered devices is the ease with which batteries can be improperly installed. In many instances, it is just as easy to install a battery in the incorrect direction as in the correct direction. Without a fail-safe method of installing a battery correctly, incorrect installation is bound to occur, causing faulty or no operation of the device and more downtime.

A further problem with batteries is inadvertent shorting. Battery terminals that project from the case can come in contact with metal tools or work surfaces and short out. A battery can be drained or damaged in this way, often without exhibiting any readily apparent symptoms. Batteries with closely spaced terminals connected to opposite electrodes are especially susceptible to shorting.

Consequently, to overcome the shortcomings and problems mentioned, there is a need for a battery arrangement that is space-efficient, difficult to short out, easy to install correctly, and difficult to install incorrectly.

SUMMARY

These needs are satisfied by a battery pack and a multi-pack battery module having features of the invention. The module includes a housing encasing two or more battery packs end to end with the first end of a forward battery pack facing the second end of a rearward battery pack. Each battery pack comprises one or more cells interconnected to form a battery with a positive and a negative electrode. A positive terminal at the first end of the battery pack is electrically connected to the positive electrode. A negative terminal at the first end is electrically connected to the negative electrode. A first auxiliary terminal at the first end is electrically connected to a second auxiliary terminal at the second end by a conductive element in the battery pack that bypasses the battery. The terminals at the facing ends of adjacent battery packs mate with one another such that the positive terminal at the first end of the forward battery pack is connected to the second auxiliary terminal at the second end of the rearward battery pack. In this way, the positive electrodes of the forward and rearward battery packs are accessible at individual terminals at the second end of the rearward battery pack.

In a preferred version of the module for housing two battery packs, a pair of first auxiliary terminals at the first end of each battery pack is connected by individual conductive elements to a pair of second auxiliary terminals at the second end. The pair of second auxiliary terminals mates with the positive and negative terminals at the first end of a forward battery pack to route both electrode connections to the first end of the rearward pack. In this way, the positive and negative electrodes of both battery packs are accessible at the first end of the rearward battery pack.

In another version of the battery pack, a second negative terminal connected to the negative electrode is provided at the second end of the pack. With the negative terminal at each end centrally located, battery packs can be connected end to end with the negative terminals of adjacent packs connected to each other. This version, in which the negative electrodes of all the battery packs are connected in common rather than electrically isolated from one another, requires fewer terminals on each battery pack.

Other versions of the battery pack include features that overcome some of the problems of other batteries. For example, a keying recess is provided in one of the ends of the battery pack to receive a keying projection in the other end of an adjacent mated battery pack to maintain them in registration and prevent their misconnection. Socket and stud terminals are used for good electrical contact and for positive mechanical engagement. The terminals are also preferably recessed in the ends to make them difficult to short out on tools or work surfaces.

A preferred version of the battery module provides an end cap that includes a butt plate with terminals to mate with the terminals at the first end of the rearmost battery pack. The butt plate terminals are routed through the end cap via a connector, for example, to the apparatus to be powered. A latch mechanism positively locks the end cap into position sealing an end of the housing only when the battery packs are correctly installed. In a preferred version, the latch mechanism includes a spring-loaded button on the end cap that resides in a mating hole in the wall of the housing. The latch mechanism can be disengaged by thumb pressure for easy removal of the battery packs.

DRAWINGS

These and other features, aspects, and advantages of the invention are better understood by reference to the following description, appended claims, and accompanying drawings in which:

DESCRIPTION

Figure 1:
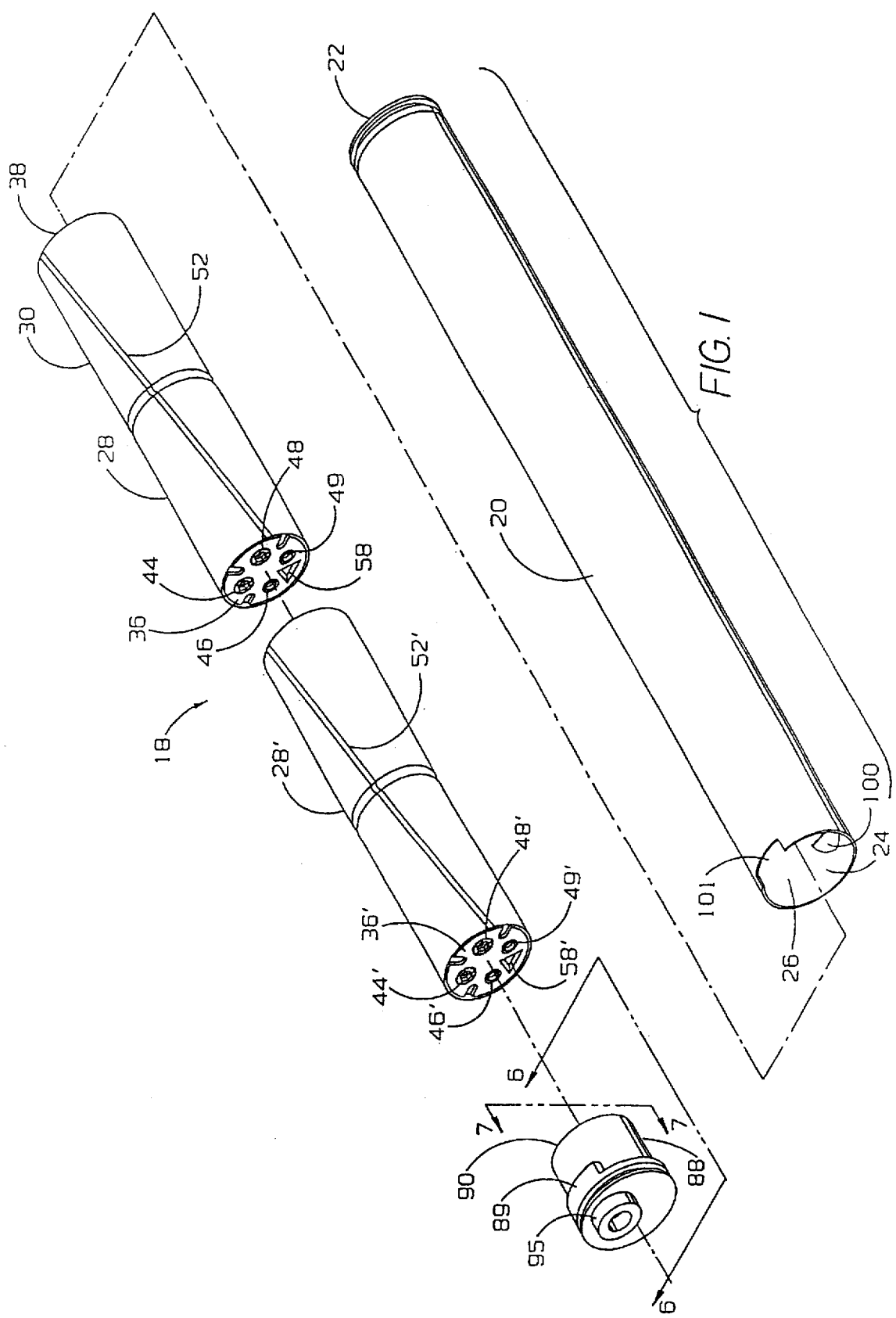
FIG. 1 is an exploded perspective view of one version of a battery module with two battery packs embodying features of the invention.

An exploded view of one version of a battery module 18 incorporating features of the invention is shown in FIG. 1. In the version shown, a cylindrical housing 20, preferably made of fiberglass or a plastic material, has a dead end 22 and an opposite open end 24. The housing 20 has a cylindrical bore forming a chamber 26 for housing, in this version, two battery packs 28, 28'. The diameter of the chamber 26 is slightly greater than the outside diameter of the cylindrical battery packs 28, 28'. In this way, the battery packs can be easily slid into and out of the housing 20, but fit snugly enough that they do not rattle during use.

Figure 2:
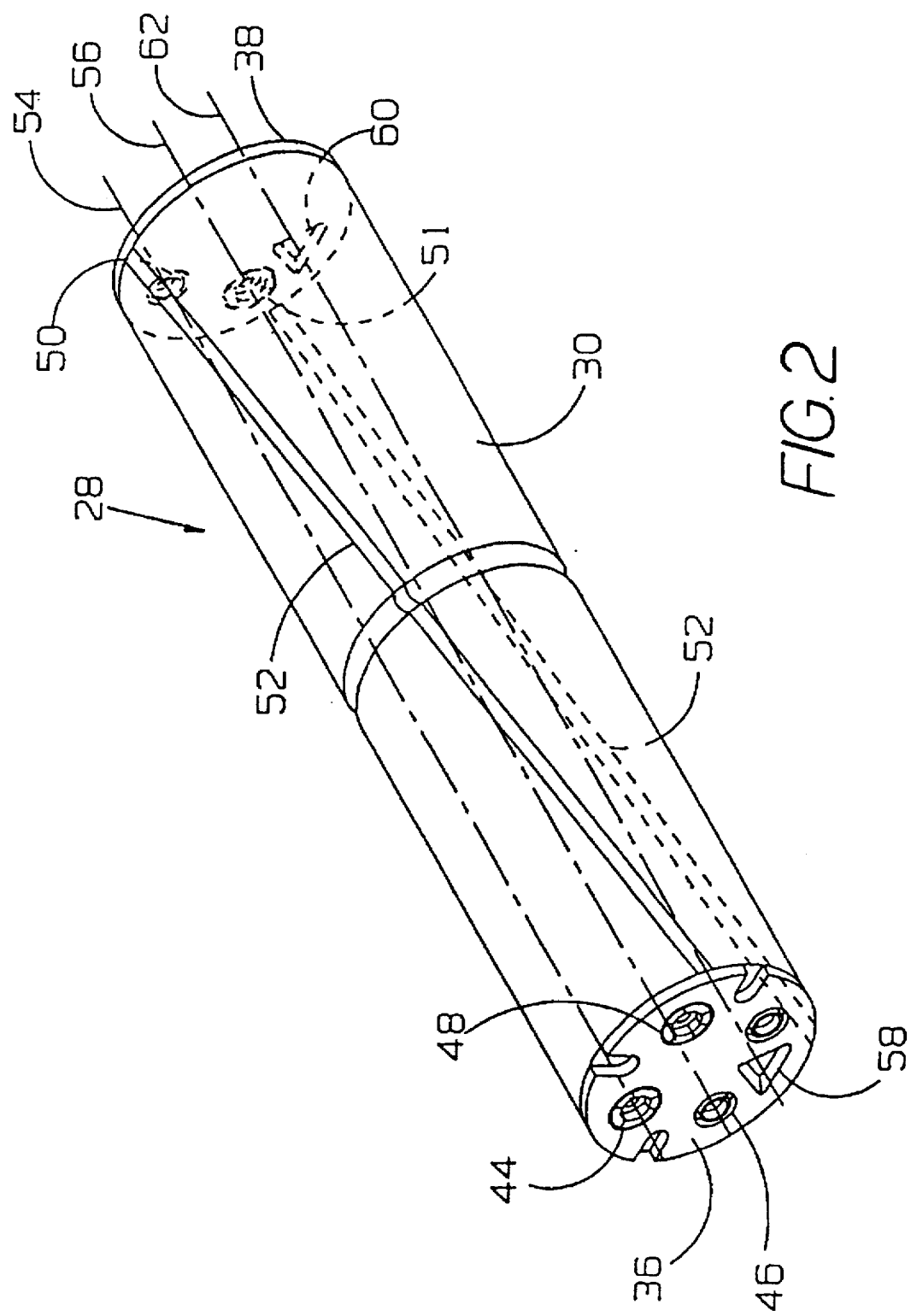
FIG. 2 is a perspective view of an individual battery pack of FIG. 1 with hidden features in phantom.
Figure 3:
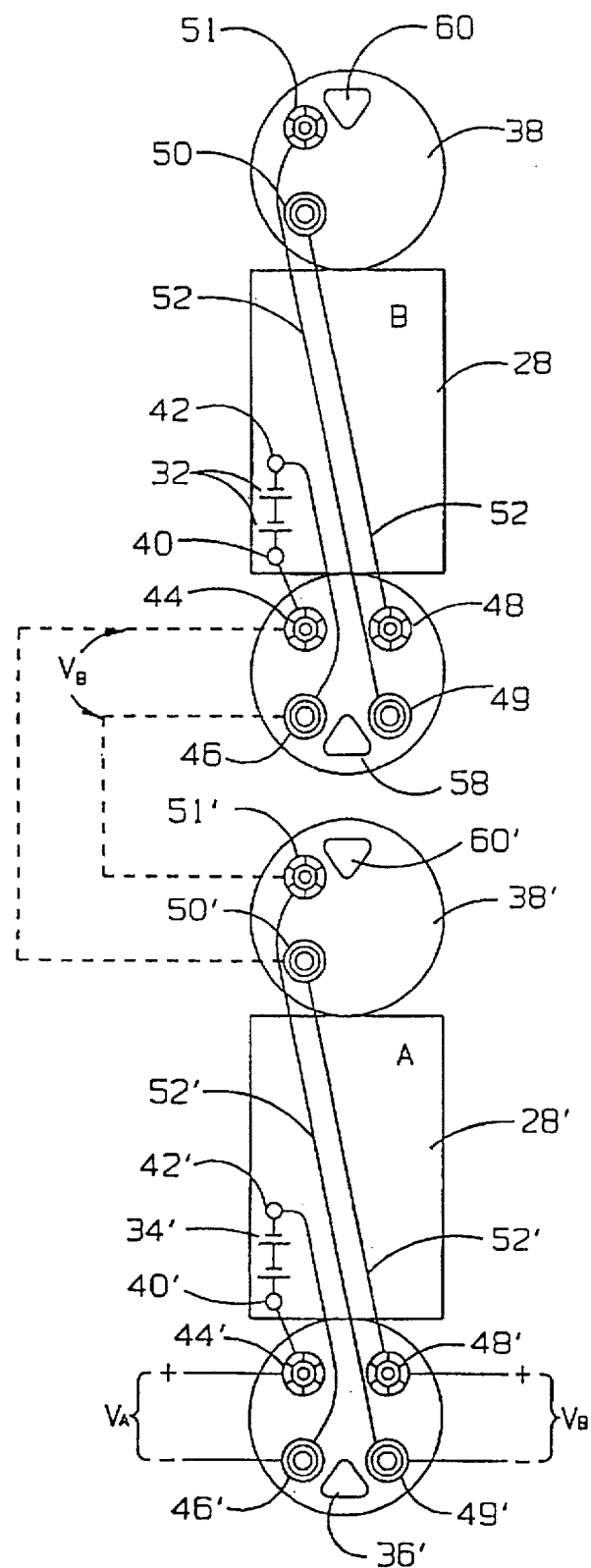
FIG. 3 is a hybrid end plate pattern/electrical schematic diagram of one version of a two-battery-pack arrangement incorporating features of the invention.

As further illustrated in FIGS. 2–3, each battery pack 28 includes an outer casing 30, preferably cylindrical to match the geometry of the chamber 26. One or more conventional cells 32, such as nickel-cadmium, lithium-ion, or lithium thionyl chloride, are electrically interconnected to form a battery 34. Circular plates at a first end 36 and an opposite second end 38 of the battery pack 28, along with the casing 30, seal the battery 34. Two electrodes of opposite polarity—a positive electrode 40 and a negative electrode 42—terminate the battery 34. The positive electrode 40 is electrically connected to a positive terminal 44 at the first end 36 of the battery pack 28. The negative electrode 42 is likewise connected to a negative terminal 46, also at the first end 36 of the battery pack 28.

In the versions shown in FIGS. 1–3, the battery pack 28 includes a pair of auxiliary terminals at each end. A first pair 48, 49 of auxiliary terminals is disposed at the first end 36 of the battery pack 28. A second pair 50, 51 of auxiliary terminals is disposed at the second end 38. Each of the first pair 48, 49 at the first end is electrically connected to a corresponding one of the second pair 50, 51 by an individual conductive element 52. Preferably, each conductive element is a thin conductive ribbon that runs along the casing 30 just inside its outer layer. Thus, the conductive elements 52 are constructed unitarily with the battery pack 28 and have only a minuscule effect on its outer dimensions.

In the battery pack shown best in FIG. 2, the positive terminal 44 at the first end 36 and one of the auxiliary terminals 50 at the second end 38 lie along a first axis 54. The negative terminal 46 and the other of the auxiliary terminals 51 lie along a second axis 56. The axes are parallel to each other and to the axis of symmetry of the cylindrical battery pack 28. A triangular keying recess 58 is also formed in the plate at the first end 36 of the battery pack. A similarly shaped keying projection 60 extending from the second end 38 of the battery pack is aligned with the recess 58 along a third parallel axis 62. With the relative positions of the terminals and the keying features fixed, the positive terminal 44 and the negative terminal 46 at the first end 36 of the forward battery pack 28 mate with the second auxiliary terminals 50', 51' at the second end 38' of the rearward battery pack 28'. The layout of the terminals and the keying features at the ends of the battery pack prevent the terminals from being misconnected. To further ensure correct battery connection, terminals of the socket and stud kind, in which a socket (e.g., the positive terminal 44) mates only with a stud (e.g., second auxiliary terminal 509, are used. Low-cost 9-volt battery terminals, which have sufficient retention force when engaged to retain adjacent end-to-end connected battery packs together, are the preferred terminals. The terminals are preferably recessed into the plate at the first end of the battery pack to prevent inadvertent shorting by contact with tools or metallic work surfaces.

As depicted in the version of FIG. 3, which is the same as that in FIGS. 1–2 and in which primed reference numerals refer to like structure on a rearward battery pack 28', the electrode voltages of a forward battery pack B 28 and a rearward battery pack A 28' are accessible at the terminals at the first end 36' of pack A. The electrodes of 40, 42 of forward battery pack B are connected to the positive and negative terminals 44, 46 at the first end 36 of pack B. The other two terminals 48, 49 are merely dummy terminals because they are connected to corresponding terminals 50, 51, which are not otherwise connected. As indicated by the dashed lines, the positive and negative terminals 44, 46 of pack B mate with auxiliary terminals 50', 51' at the second end 38' of rearward pack A. The conductive elements 52' in pack A electrically connect the electrodes of pack B to terminals 48', 49' at the first end 36' of pack A. The electrodes 40', 42' of the battery 34' in pack A are connected directly to the positive and negative terminals 44', 46' at the first end 36' of pack A. Thus, all of the electrodes of both batteries are accessible from the first end 36' of the rearward battery 28' merely by mating the two battery packs end to end as described.

Figure 4:
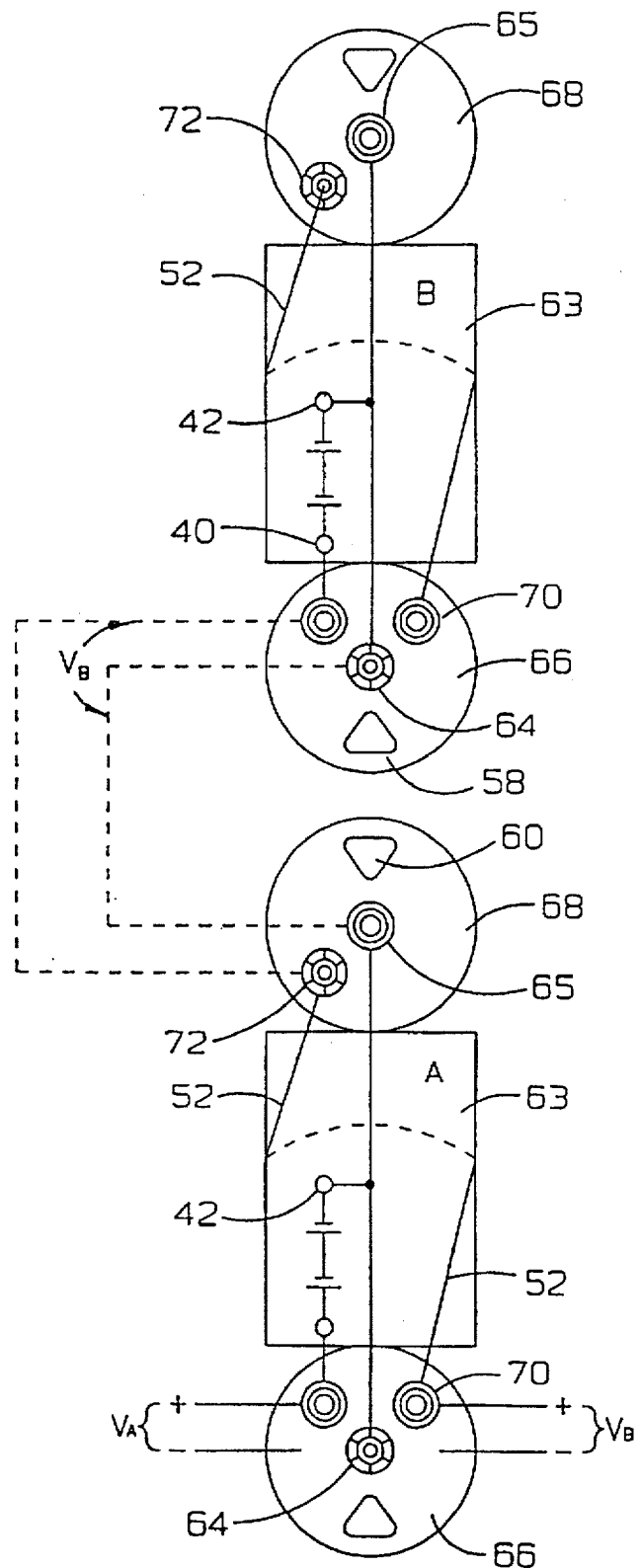
FIG. 4 is a hybrid end plate pattern/electrical schematic diagram as in FIG. 3 of another two-battery-pack version.

Another version of the battery pack eliminates one of the terminals at the first end 36. In this version, which is shown in FIG. 4, the negative electrode 42 of a battery pack 63 is connected in common to a first common terminal 64 at the first end 66 and to a second common terminal 65 at the second end 68. Preferably, each common terminal 64, 65 is situated in the center of each end. In other respects, the version of FIG. 4 is similar to that of FIG. 3. A single auxiliary terminal 70 at the first end 66 is electrically connected to a corresponding auxiliary terminal 72 at the second end 68 by a conductive element 52. When two such battery packs 63 are connected end to end as shown, the positive electrode 40 of forward pack B is electrically coupled via the conductive element 52 of rearward battery pack A to the auxiliary terminal 70 at the first end 66 of pack A. (The dashed arc between portions of the conductive element in each battery pack 63 indicates that the portions are electrically connected.) Thus, the electrodes of both battery packs are accessible from terminals at the first end 66 of the rearward battery pack.

It is possible to gang more than two battery packs end to end by adding auxiliary terminals to each end of the packs and conductive elements to connect the terminals. Only the sizes of the end plates and the terminals limit the number of terminals and, thereby, the number of battery packs that can be connected together end to end in an extended arrangement similar to that described for two packs.

Figure 5:
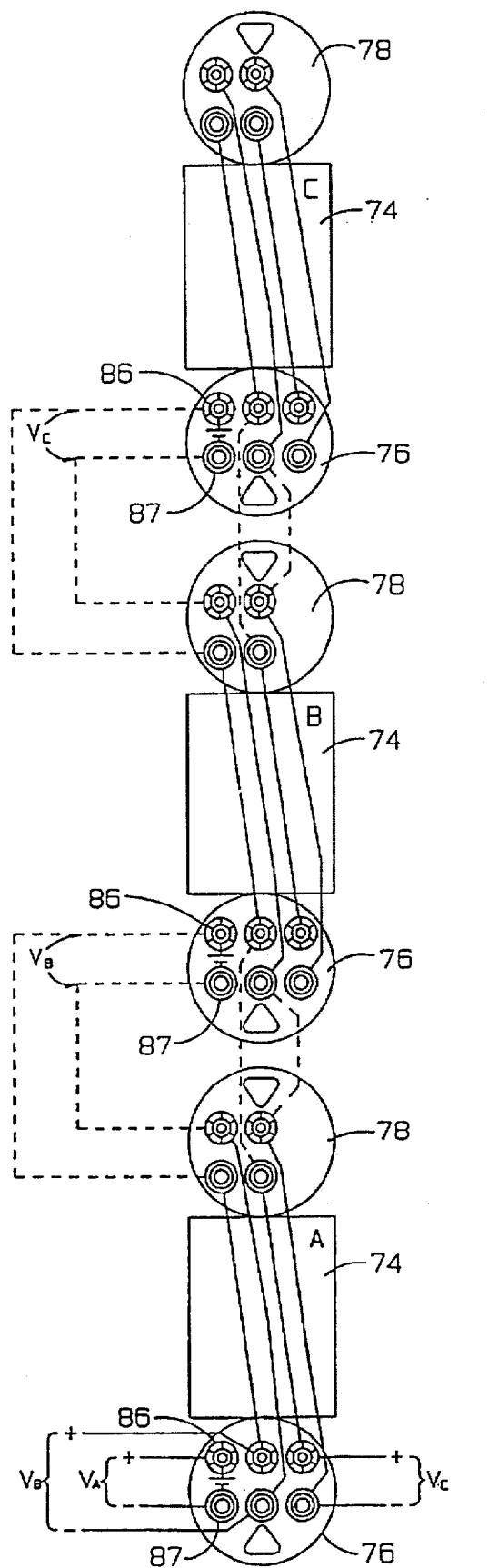
FIG. 5 is a hybrid end plate pattern/electrical schematic diagram as in FIGS. 3–4 depicting an arrangement of three battery packs.

The version depicted in FIG. 5 is an arrangement of three battery packs 74. Each pack has a first end 76 and an opposite second end 78. The first end of a forward battery pack is connected to the second end of a rearward battery pack as indicated by the dashed lines. Each of a first set 80 of four terminals at the first end 76 is connected to a corresponding one of a second set 82 of four terminals at the second end 78 by an individual conductive element 84, such as a ribbon conductor. The interconnected first and second sets 80, 82 of terminals in each battery pack 74 bypass an enclosed battery (not shown, but equivalent to that previously discussed) in each pack. Additional terminals 86, 87 at the first end 76 are connected to the positive and negative electrodes of the battery. The battery packs 74 are arranged end to end with two of the first set 80 of terminals of a forward battery pack mating with two of the second set 82 of an adjacent rearward pack and with the two additional terminals 86, 87 of the forward pack mating with the remaining two terminals of the second set 82 of the rearward pack. As shown in FIG. 5, this arrangement makes the electrodes of three battery packs accessible at the first end 76 of the rearmost battery pack.

It is thus readily apparent that for a number N of battery packs (N≧2) to be connected end to end in the manner of FIGS. 3 and 5, in which the negative electrodes are not common, the first end of each battery pack requires 2N–2 auxiliary terminals at the first end, 2N–2 auxiliary terminals at the second end, and 2N–2 conductive elements forming individual connections between auxiliary terminals at opposite ends. The first end of each battery pack further requires two additional terminals connected to the battery's electrodes. The terminals at each end are configured to mate with each other in such a way that the two additional terminals and 2N–4 of the auxiliary terminals at the first end of a battery pack mate with the 2N–2 terminals at the second end of an adjacent pack. In this way the electrodes of all the battery packs are accessible at the 2N terminals at the first end of the rearmost pack.

In the common electrode version, exemplified in FIG. 4 for a two-pack arrangement, a total of N terminals (one a common terminal) are required at the second end and a total of N+1 (one a common terminal) are required at the first end to make the electrodes of N end-to-end-connected battery packs accessible at the first end of the rearmost pack. Thus, for arranging larger numbers of battery packs, the common-electrode version is more attractive because it requires fewer terminals and associated conductive elements.

Figure 6:
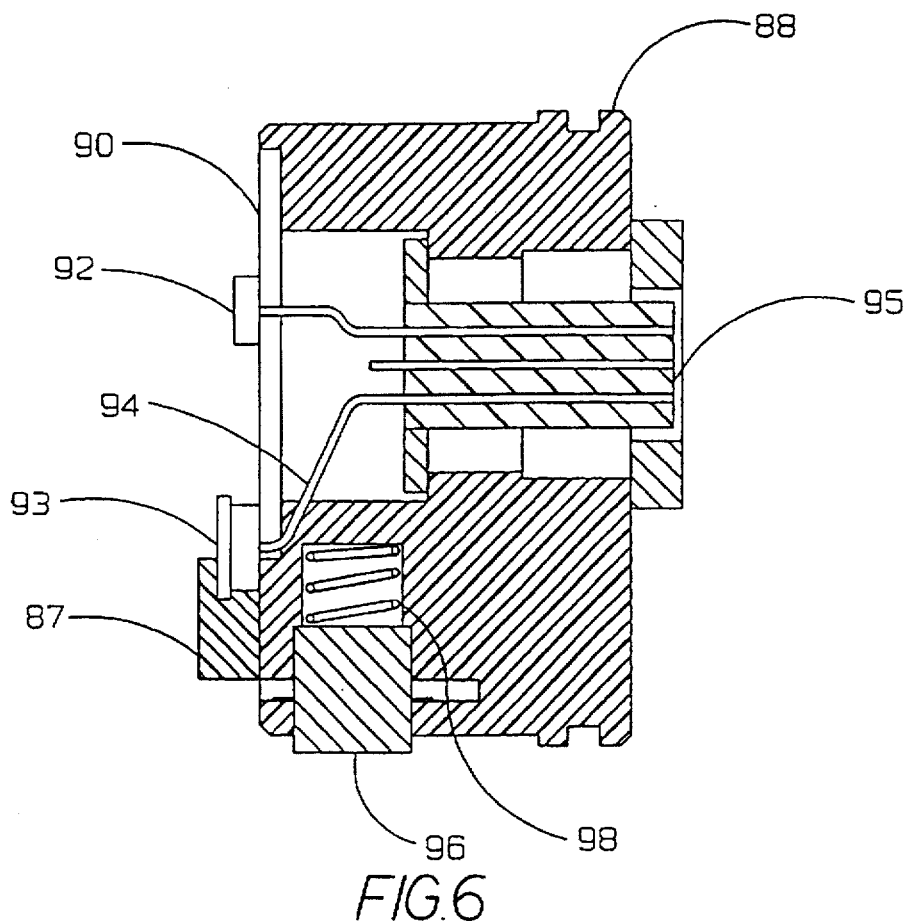
FIG. 6 is a side sectional view of the end cap of FIG. 1.
Figure 7:
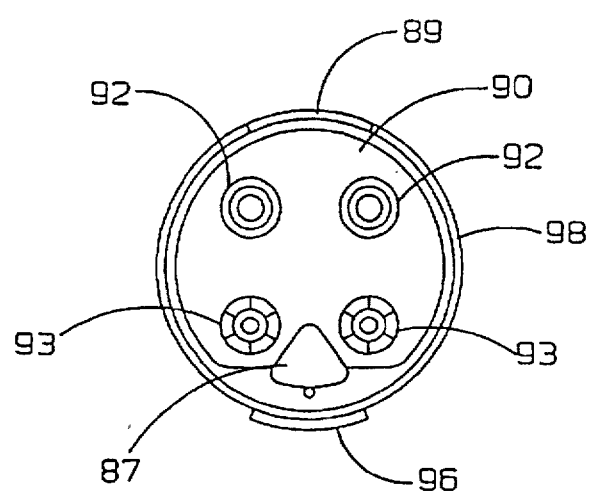
FIG. 7 is an end view of the end cap of FIG. 1.

As shown in FIG. 1, the two end-to-end-connected battery packs 28, 28' are held in the chamber 26 by an end cap 88. As best shown in FIGS. 6 and 7, the end cap includes an alignment tab 89 and a butt plate 90 that abuts the first end 36' of the rearward battery pack 28' and includes terminals 92, 93 configured to mate with the terminals 44', 48', 46', 49' at the first end of the rearward pack 28'. A keying projection 87 extends from the end cap 88 outward of the butt plate 90 to fit in the keying recess 58' of the rearward battery pack 28'. The terminals 92, 93 are connected by wires 94 to a multi-pin connector 95 extending through the outer end of the end cap 88. A mating connector and associated wiring harness (not shown) route the electrode connections at the connector pins to circuits to be powered by the battery module.

A fail-safe latching mechanism ensures that the battery packs 28, 28' are properly installed in the housing 20. The latching mechanism comprises a push button 96 extending radially from the end cap 88 near the butt plate 90. The push button is loaded by a spring 98, which biases the button radially outward from the end cap. The portion of the push button 96 extending from the end cap 88 is preferably triangular in shape. A hole 100 through the wall of the housing 20 near its open end 24 is shaped to receive the push button 96. A notch 101 in the wall is shaped to receive the alignment tab 89 on the end cap. Only when the two battery packs 28, 28' and the end cap 88 are correctly connected end to end can the push button 96 register into the hole 100. Once the push button 96 and hole 100 and the tab 89 and notch 101 are in registration, the spring 98 latches the push button in place in the hole. The latching mechanism prevents the battery packs 28, 28' from moving around inside the housing 20. Thumb pressure on the push button 96 unlatches the end cap 88, which can then be slid out of the housing 20 along with the attached battery packs 28, 28' to remove them from the module.

Battery packs can be easily replaced by connecting adjacent packs 28, 28' together end-to-end and to an end cap 88 and then sliding that package into the empty chamber 26 through the open end 24 of the housing 20. Slight thumb pressure on the push button 96 retracts it enough to enable it to enter the open end and be slid into registration with the matching hole 100. Once in registration, the spring 98 snaps the push button 96 into its latched, extended position through the hole 100.

Figure 8:
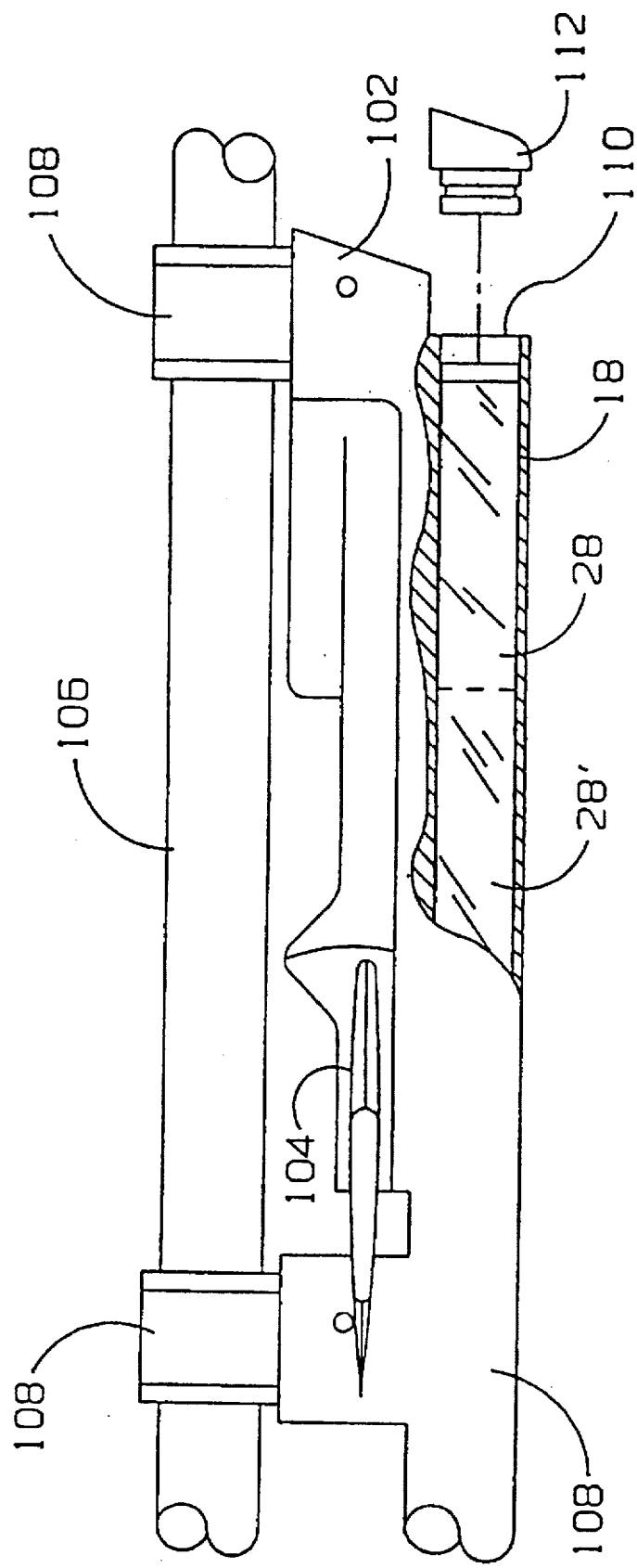
FIG. 8 is a side view, partially in section, of a cable-positioning, depth-control device incorporating the battery module of FIG. 1.

A typical application of the battery module is shown in FIG. 8. A cable-leveling bird 102 with tiltable control surfaces, or wings 104, on each side is attached to a seismic hydrophone cable 106 by a pair of collar assemblies 108 surrounding the cable. The collar assemblies permit the cable to rotate relative to the bird. The bird 102, which includes a depth sensor (not shown), controls the depth of the cable 106 according to a preloaded setting or as commanded by a message transmitted along the cable and inductively communicated to the bird. A two-pack battery module 18 fits in a tubular portion 108 of the bird 102. The module slides in place through an opening 110 in the front of the bird 102 that is sealed by a threaded end plug 112. In this way, spent battery modules can be easily removed and fresh modules installed in their place. Bank-switching circuits in the bird 102 sense when one of the battery packs 28 is discharged and switch the other battery pack in the module 18 into the circuit to be powered. In this way, the frequency of downtime is reduced by the novel battery module.

Although only a few exemplary versions of the invention have been described in detail, those skilled in the art will readily appreciate that many modifications are possible in the exemplary versions without materially departing from the novel teachings and advantages of the invention. For example, the keying recess and the keying projection could be disposed on either end of the battery pack. The shape of the keying projection and recess could be other than triangular. Its shape could equivalently be rectangular, oval, or almost any shape. The same is true of the latching push button on the end cap. The terminals at the ends of the battery packs and on the butt plate of the end cap could be laid out in many geometrical patterns other than those shown in the drawings. The battery packs themselves could be shaped other than cylindrical. Stud and socket terminals other than 9-volt battery terminals could equivalently be used. Furthermore, the terms "positive" and "negative" in reference to battery polarity are used throughout the description and claims in their common usage for clarity and not in a limiting sense. Interchanging the positive and negative electrodes, or changing the battery's polarity, results in an equivalent version of the invention. Accordingly, all such modifications are intended to be included within the scope of the invention as defined in the following claims.

What is claimed is:

1. A multi-pack battery module comprising:
   at least two battery packs, each battery pack having a first end and a second end;
   a housing in which the battery packs are arranged end to end with the first end of a forward battery pack proximate the second end of an adjacent rearward battery pack;
   each battery pack including:
      one or more interconnected cells forming a battery having a positive electrode and a negative electrode;
      a positive terminal at the first end of the battery pack electrically connected to the positive electrode;
      a negative terminal at the first end of the battery pack electrically connected to the negative electrode;
      a first auxiliary terminal at the first end of the battery pack and a second auxiliary terminal at the second end of the battery pack; and
      a conductive element electrically connecting the first auxiliary terminal to the second auxiliary terminal;
   the positive terminal at the first end of a forward battery pack mating with the second auxiliary terminal at the second end of an adjacent rearward battery pack and electrically coupling the positive terminal of the forward battery pack to the first auxiliary terminal at the first end of the rearward battery pack, whereby the positive electrodes of the battery packs are electrically connected to individual terminals at the first end of the rearward battery pack.

2. A multi-pack battery module as in claim 1 further comprising a keying projection in one of the first and second ends and a keying recess in the other of the first and second ends of the battery packs shaped to receive the keying projection to maintain adjacent mated battery packs in registration and prevent their misconnection.

3. A multi-pack battery module as in claim 1 wherein the terminals at the first end of the battery packs are recessed within the end.

4. A multi-pack battery module as in claim 1 composed of N battery packs connected end to end, each battery pack having 2N–2 first auxiliary terminals at the first end, 2N–2 second auxiliary terminals at the second end, and 2N–2 conductive elements each electrically connecting one of the first auxiliary terminals to one of the second auxiliary terminals wherein the positive terminal at the first end of a forward battery pack is mated with one of the second auxiliary terminals at the second end of an adjacent rearward battery pack, wherein the negative terminal at the first end of the forward battery pack is mated with another of the second auxiliary terminals of the adjacent rearward battery pack, and wherein the remaining 2N–4 second auxiliary terminals at the second end of the adjacent rearward battery pack are mated with a like number of first auxiliary terminals at the first end of the forward battery pack, whereby the positive and the negative electrodes of the battery packs are electrically connected to individual terminals at the first end of the rearmost battery pack.

5. A multi-pack battery module as in claim 1 wherein each battery pack further comprises a second negative terminal at the second end of the battery pack electrically connected to the negative electrode of the battery and to the negative terminal at the first end of the battery pack.

6. A multi-pack battery module as in claim 5 wherein the negative terminal at the first end and the second negative terminal at the second end are disposed in the center of the first and second ends respectively and wherein the negative terminal at the first end of a forward battery pack is mated with the second negative terminal at the second end of an adjacent rearward battery pack.

7. A multi-pack battery module as in claim 1 wherein the housing includes an outer wall enclosing a battery chamber in which the battery packs reside and forming an access opening at an open end for inserting and removing battery packs and further comprising an end cap for sealing the access opening and a latch mechanism releasably retaining the end cap to the housing.

8. A multi-pack battery module as in claim 7 wherein the latch mechanism comprises a spring-loaded button on the periphery of the end cap and wherein the wall of the housing near the access opening forms a hole shaped to receive the spring-loaded button when the end cap is in place sealing the end of the housing.

9. A compact arrangement of battery packs, each battery pack comprising:
   a casing with a first end and a second end;
   a battery with two electrodes of opposite polarity disposed within the casing;
   a first set of terminals at the first end;
   a second set of terminals at the second end corresponding in number to the first set of terminals;
   an electrical connection from each of the second set of terminals at the second end to a corresponding one of the first set of terminals at the first end;
   a first additional terminal at the first end electrically connected to one of the electrodes of the battery;
   the battery packs being arranged end to end with the first end of a forward battery pack proximate the second end of an adjacent rearward battery pack and with the terminals at the second end of the rearward battery pack configured to mate with a portion of the terminals at the first end of the adjacent forward battery pack, the portion including the first additional terminal electrically connected to one of the electrodes of the battery in the forward battery pack, whereby electrodes from forward battery packs are electrically connected to terminals at the first end of the rearmost battery pack.

10. A compact arrangement of battery packs as in claim 9 comprising a second additional terminal at the first end of each battery pack electrically connected to the other of the electrodes of the battery.

11. A compact arrangement of battery packs as in claim 10 further comprising a third additional terminal at the second end of each battery pack electrically connected to the second additional terminal at the first end.

12. A compact arrangement of battery packs as in claim 9 wherein, in an arrangement of N battery packs, each battery pack has 2N–2 terminals in the first set at the first end, 2N–2 terminals in the second set at the second end, and two additional terminals at the first end, each electrically connected to respective ones of the two electrodes.

13. A compact arrangement of battery packs as in claim 9 wherein the terminals at the first end of the battery packs are recessed within the end.

14. A compact arrangement of battery packs as in claim 9 further comprising a keying projection in one of the first and second ends and a keying recess in the other of the first and second ends of the battery packs shaped to receive the keying projection to maintain adjacent mated battery packs in registration and prevent their misconnection.

15. A battery pack for use in a compact arrangement of a plurality of such battery packs in end-to-end connection, comprising:
   a casing having a first end with a first set of terminals and a second end with a second set of terminals corresponding in number to the first set of terminals;

a battery having a positive electrode and a negative electrode disposed within the casing;

a plurality of conductive elements, each electrically connecting one of the terminals of the second set to a corresponding terminal of the first set; and an additional terminal at the first end electrically connected to one of the electrodes;

wherein the second set of terminals is configured to mate with the additional terminal and a portion of the first set of terminals of an adjacent battery pack in end-to-end connection.

16. A battery pack as in claim 15 further comprising a second additional terminal at the first end electrically connected to the other of the electrodes.

17. A battery pack as in claim 15 wherein there are two terminals in the first set and two terminals in the second set.

18. A battery pack as in claim 15 further comprising a keying projection at one of the first and second ends and a similarly shaped keying recess at the other end.

19. A battery pack as in claim 15 wherein the electrical conductors comprise individual conductive ribbons.

20. A battery pack as in claim 15 wherein the terminals at the first end are recessed within the end.

21. A battery pack for use in a compact arrangement of two battery packs in end-to-end connection, comprising:

a casing having a first end with a first pair of terminals and a second end with a second pair of terminals;

a pair of conductive elements, each electrically connecting one of the terminals of the second pair to a corresponding terminal of the first pair;

a battery having a positive electrode and a negative electrode disposed within the casing;

a positive terminal at the first end electrically connected to the positive electrode; and a negative terminal at the first end electrically connected to the negative electrode;

wherein the second pair of terminals at the second end is configured to mate with the positive and negative terminals at the first end of an adjacent battery pack in end-to-end connection.

22. A battery pack as in claim 21 wherein each of the pair of conductive elements is electrically isolated from the other and from the battery.

* * * * *